May 21, 1957  F. KOCH  2,792,749
WIDE ANGLE ANASTIGMATIC OBJECTIVE COMPRISING TWO
NEGATIVE INNER MENISCUS COMPONENTS BETWEEN
TWO OUTER POSITIVE MENISCUS COMPONENTS
Filed Aug. 5, 1953
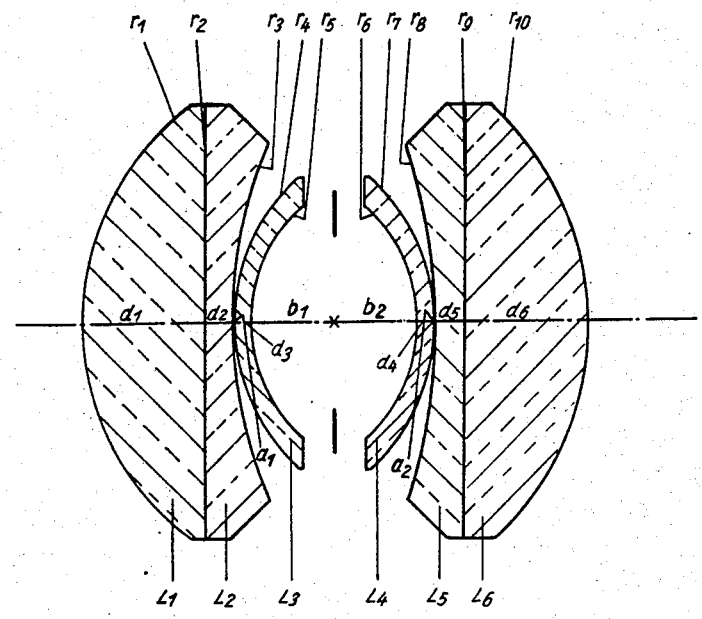

ic Office 2,792,749
Patented May 21, 1957

2,792,749

WIDE ANGLE ANASTIGMATIC OBJECTIVE COMPRISING TWO NEGATIVE INNER MENISCUS COMPONENTS BETWEEN TWO OUTER POSITIVE MENISCUS COMPONENTS

Friedrich Koch, Heidenheim (Brenz), Germany, assignor to Carl Zeiss, Heidenheim (Brenz), Germany Application August 5, 1953, Serial No. 372,471

Claims priority, application Germany August 17, 1952

1 Claim. (Cl. 88—57)

The invention concerns an anastigmatic objective for photography and projection, in which two collective components enclose two dispersive components, whereby all eight exterior surfaces of these components turn their concave sides towards the diphragm space bounded by the inside components and the vertex distance of the components bounding the diphragm space is greater than 4/5 of the arithmetic mean of the radii of curvature of these surfaces. Such an objective was made known through the U. S. patent specification No. 2,031,792.

In accordance with the invention objectives of such a construction can be improved thereby, that each of the two collective components consists of at least two lenses, which have a color dispersion differing from one another in such a way, that the lens with the lesser color dispersion always is the outside one and has a collective refractive power, and that each of these outside, collective lenses exhibits a greater mean refractive index than the dispersive lens of its adjacent collective outer component. Through this it is possible to improve the chromatic difference of the image curvatures, which otherwise is wont to appear with the large image angles, for which the objective is intended.

In the figure of the accompanying illustration an execution example of an objective in accordance with the invention is represented. The numerical values stated in the following refer to the example illustrated. The invention however is not restricted to this example.

The illustrated example refers to an objective with the focal length $f=94$ mm., the relative aperture 1:4 and an image field of about 60°. The construction data are as follows:

|  |  |  | $n_D$ | V |
|---|---|---|---|---|
| $L_1$ | $r_1=+26.6$ | $d_1=12.0$ | 1.6910 | 54.8 |
|  | $r_2=\infty$ |  |  |  |
| $L_2$ |  | $d_2=2.83$ | 1.6676 | 41.9 |
|  | $r_3=+44.0$ |  |  |  |
|  |  | $a_1=0.02$ |  |  |
|  | $r_4=+19.39$ |  |  |  |
| $L_3$ |  | $d_3=1.5$ | 1.7847 | 25.7 |
|  | $r_5=+15.2$ |  |  |  |
|  |  | $b_1=8.1$ |  |  |
|  |  | $b_2=8.1$ |  |  |
|  | $r_6=-15.2$ |  |  |  |
| $L_4$ |  | $d_4=1.5$ | 1.7847 | 25.7 |
|  | $r_7=-19.39$ |  |  |  |
|  |  | $a_2=0.02$ |  |  |
|  | $r_8=-54.8$ |  |  |  |
| $L_5$ |  | $d_5=2.83$ | 1.6676 | 41.9 |
|  | $r_9=\infty$ |  |  |  |
| $L_6$ |  | $d_6=12.0$ | 1.6910 | 54.8 |
|  | $r_{10}=-28.4$ |  |  |  |

In this table and in the accompanying drawing are designated with $r_1 \ldots r_{10}$ the radii of curvature of the individual lens elements, with $d_1 \ldots d_6$ the lens thicknesses, with $a_1, a_2, b_1, b_2$ the air separations between the individual components and with the diaphragm resp., with $n_D$ the refractive indices and with V the Abbe numbers of the individual lenses.

I claim:

A photographic objective comprising two negative meniscus inner components concave toward each other and enclosing a central inner air space and diaphragm therein and two positive meniscus outer components concave toward the negative components and all axially aligned and airspaced apart, characterized by the front positive component and the rear positive component each consisting of a negative element facing the negative components and of a positive element cemented thereto and by the mean refractive index of the positive element in each said positive component being greater than that of the said negative element cemented thereto by between 0.02 and 0.1 and its dispersive index being between 100% and 140% of that of the negative element cemented thereto, and the central inner air space being greater than 80% and smaller than 130% of the arithmetic mean of the radii of curvature of the inner concave surfaces of said negative components bounding said air space.

References Cited in the file of this patent

UNITED STATES PATENTS

| 2,031,792 | Richter | Feb. 25, 1936 |
| 2,116,264 | Hasselkus et al. | May 3, 1938 |
| 2,383,115 | Durand | Aug. 21, 1945 |
| 2,518,719 | Reiss | Aug. 15, 1950 |
| 2,559,875 | Herzberger | July 10, 1951 |

FOREIGN PATENTS

| 439,556 | Germany | Jan. 13, 1927 |
| 329,350 | Great Britain | May 16, 1930 |
| 689,916 | Great Britain | Apr. 18, 1953 |